Figure 1:
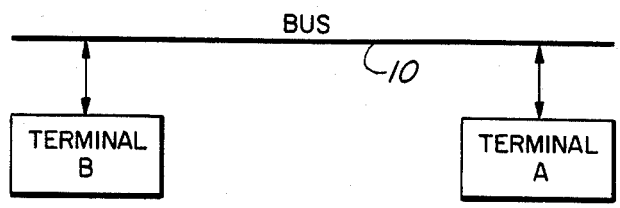

United States Patent [19]

Hadziomerovi

[11] Patent Number: 4,516,236
[45] Date of Patent: May 7, 1985

[54] FULL-DUPLEX TRANSMISSION OF BIT STREAMS SERIALLY AND IN BIT-SYNCHRONISM ON A BUS BETWEEN TWO TERMINALS.

[75] Inventor: Faruk Hadziomerovi, Kanata, Canada

[73] Assignee: Northern Telecom Limited, Montreal, Canada

[21] Appl. No.: 535,423

[22] Filed: Sep. 26, 1983

[51] Int. Cl.³ .............................................. H04B 1/56
[52] U.S. Cl. ........................................ 370/24; 370/27; 370/32
[58] Field of Search ...................... 370/24, 85, 27, 32

[56] References Cited

U.S. PATENT DOCUMENTS 3,566,032  2/1971  Carbone et al. ...................... 370/27
3,993,867  11/1976  Blood, Jr. ............................. 370/27
4,393,494  7/1983  Belforte et al. ...................... 370/32

Primary Examiner—Joseph A. Orsino, Jr.
Assistant Examiner—Timothy K. Greer
Attorney, Agent, or Firm—R. John Haley

[57] ABSTRACT

Each of two terminals transmits a bit stream to a two-wire line in the form of a unipolar pulsed signal, the terminals transmitting pulses of opposite polarity with the bits synchronized, so that the line acts as a distributed exclusive-or gate. In each terminal, pulses on the bus are detected and a consequent received bit stream is exclusively-ored with the bit stream transmitted by this terminal to recover the bit stream transmitted by the other terminal.

6 Claims, 5 Drawing Figures

BYTE FROM TERMINAL A

BYTE FROM TERMINAL B

BYTE ON BUS

FULL-DUPLEX TRANSMISSION OF BIT STREAMS SERIALLY AND IN BIT-SYNCHRONISM ON A BUS BETWEEN TWO TERMINALS.

This invention relates to a method of effecting full-duplex transmission of bit (binary digit) streams serially and in bit-synchronism on a bus between two terminals, and to apparatus for carrying out the method.

It is known to transmit data bytes bit-serially on a bus from one terminal to another. In the prior art, in order to make such transmission full-duplex, separate busses have been used for the two directions of transmission, or multiplexing schemes such as TDM (time division multiplexing) have been used. Such prior art arrangements have the disadvantage of requiring an increased bandwidth, either by using more than one bus or by multiplexing signals on one bus.

An object of this invention is to provide a method of effecting full-duplex transmission, of bit streams serially and in bit-synchronism on a bus between two terminals, and apparatus for carrying out the method, in which this disadvantage is avoided or reduced.

According to one aspect, this invention provides a method of effecting full-duplex transmission of bit (binary digit) streams serially and in bit-synchronism on a bus between two terminals, comprising the steps of: transmitting the bit stream from one terminal to the bus in the form of pulses of a first polarity representing bits of one binary value and the absence of such pulses representing bits of the other binary value; transmitting the bit stream from the other terminal to the bus in the form of pulses of a second polarity, opposite to the first polarity, representing bits of one binary value and the absence of such pulses representing bits of the other binary value; and, in each terminal: detecting pulses on the bus to produce a received bit stream; and exclusively-oring the received bit stream with the bit stream transmitted by the terminal to recover the bit stream transmitted by the other terminal.

Thus the invention provides for full-duplex transmission on a bus by using opposite polarity pulses for the two transmission directions, whereby the bus itself provides an exclusive-or operation, and by effecting a further exclusive-or operation in each terminal to recover the bit stream transmitted by the other terminal.

Preferably the step of detecting pulses on the bus to produce the received bit stream comprises rectifying pulses on the bus to produce the received bit stream as a unipolar bit stream.

Conveniently the bus is a two-wire line, such as a telephone line.

According to another aspect, this invention provides apparatus comprising a bus and two terminals coupled thereto for full-duplex transmission of bit streams serially and in bit-synchronism therebetween, each terminal comprising means for supplying a bit stream to be transmitted to the bus in the form of a unipolar pulsed signal, the polarities of the unipolar pulses signals supplied to the bus by the two terminals being opposite to one another, each terminal further comprising means responsive to pulses on the bus for producing a received bit stream, and an exclusive-or gate responsive to the received bit stream and to the bit stream transmitted by the terminal to produce a recovered bit stream corresponding to the bit stream transmitted by the other terminal.

Preferably in each terminal the means responsive to pulses on the bus for producing a received bit stream comprises a rectifying amplifier responsive to pulses of either polarity on the bus for producing pulses of said received bit stream.

Preferably each terminal further comprises transmitting shift register means for producing said bit stream to be transmitted, receiving shift register means responsive to the recovered bit stream, and means for supplying bytes to the transmitting shift register means and for receiving bytes from the receiving shift register means, each byte comprising a plurality of bits.

In an embodiment of the invention, one of the two terminals can be a network termination of a public telecommunications network, whereby the other of the two terminals is able to communicate via the network.

Figure 2:
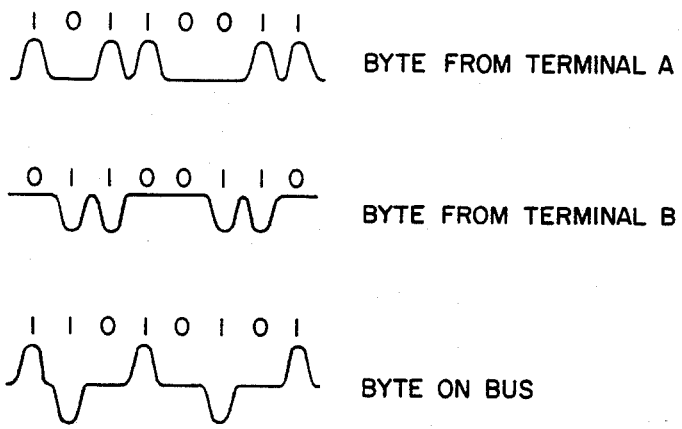
Figure 3:
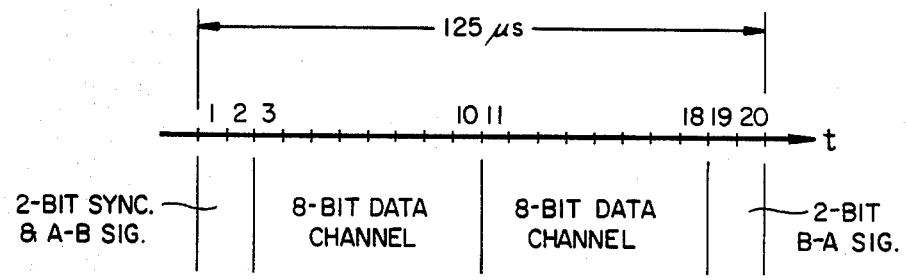
Figure 4:
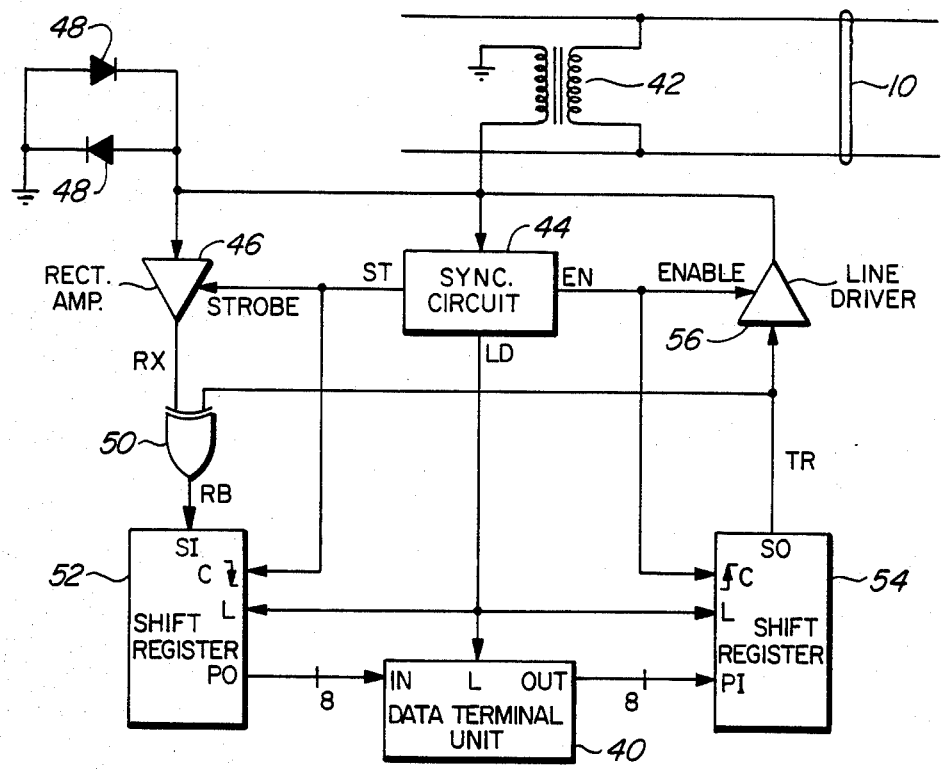
Figure 5:
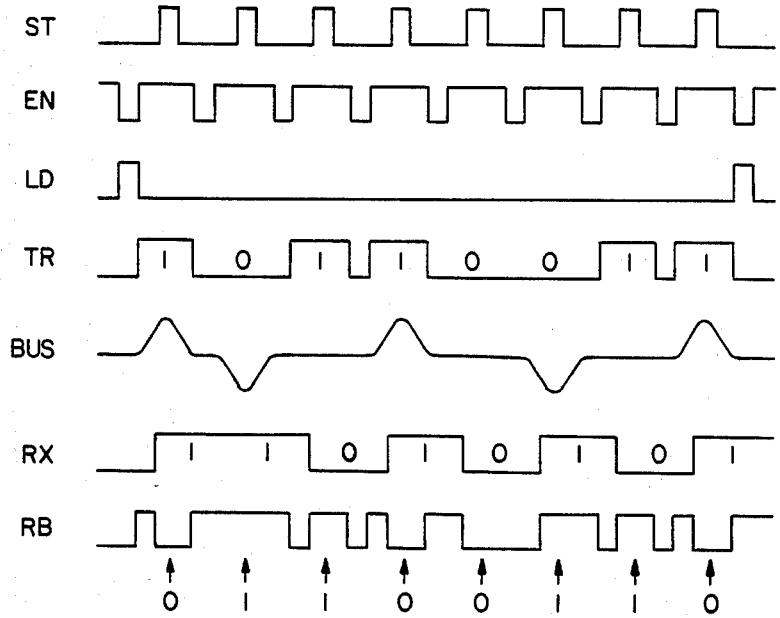

The invention will be further understood from the following description with reference to the accompanying drawings, in which:

FIG. 1 schematically illustrates an arrangement, of two terminals coupled via a bus, in accordance with the invention;

FIG. 2 illustrates the manner in which bytes are transmitted between the terminals via the bus in the arrangement of FIG. 1;

FIG. 3 111ustrates a time division multiplex (tdm) frame within which such transmission may be effected;

FIG. 4 schematically illustrates a block circuit diagram of one of the terminals in the arrangement of FIG. 1; and FIG. 5 shows signals which may occur in operation of the terminal illustrated in FIG. 4.

Referring to the drawings, FIG. 1 illustrates two terminals A and B which are coupled to a serial data bus 10 for full-duplex transmission of data bytes bit-serially therebetween. The bus 10 is, for example, a two-wire line which is preferably a balanced line.

In order to achieve this transmission, each of the terminals A and B is arranged to transmit pulses of a respective polarity to the bus 10 in response to predetermined binary digits, for example '1' bits, to be transmitted. Thus, for example, as shown in FIG. 2 an 8-bit byte to be transmitted from the terminal A to the terminal B is transmitted as a bipolar signal with a positive pulse representing each logic '1' bit. Conversely, an 8-bit byte to be simultaneously transmitted from the terminal B to the terminal A is transmitted as a bipolar signal with a negative pulse representing each logic '1' bit. The resultant signal on the bus 10 is also shown in FIG. 2.

As a result of the opposite polarity pulses transmitted by the two terminals, when both terminals transmit a '1' bit the net signal on the bus 10 is zero. Thus the bus acts as a distributed exclusive-or gate. Each terminal further includes an exclusive-or gate to which its own byte for transmission and the byte present on the bus 10 are applied. The output of this exclusive-or gate constitutes the byte transmitted by the other terminal.

In order for transmission in the above manner to take place properly, it is necessary that the two terminals A and B be synchronized with one another to transmit bits simultaneously. This can be readily achieved by using a tdm frame structure for the transmission, as shown for example in FIG. 3. In FIG. 3 a tdm frame having a duration of 125 μs is divided into twenty bit times, plus guard times which are not shown, to provide two bits, 1 and 2, for the transmission of synchronizing information and signalling information from the terminal A to the terminal B; another two bits, 19 and 20, for the transmission of signalling information in the opposite direction from the terminal B to the terminal A, thereby providing a full-duplex 16 kb/s time multiplexed signalling channel between the two terminals A and B; and two sets of eight bits, 3 to 10 and 11 to 18, to provide two full-duplex 64 kb/s data channels.

In addition to the requirement for bit synchronization between the terminals, it is necessary that the length of the bus 10 between the terminals A and B be sufficiently small that propagation delays and signal attenuation do not adversely affect detection of pulses on the bus at each terminal. For the frame structure described above, this implies a typical maximum bus length of about 230 meters.

FIG. 4 illustrates the circuit of one of the terminals A and B. Except for the polarity of pulses applied to the bus 10, the circuits of the two terminals are identical. Each terminal includes a data terminal unit 40, which can be of known form, which is coupled to the bus 10 via a transformer 42 and a circuit comprising a synchronizing circuit 44, a rectifying amplifier 46 and associated input voltage limiting diodes 48, an exclusive-or gate 50 as already mentioned, a receiving shift register 52, a transmitting shift register 54, and a line driver 56. Pulses of the desired polarity for the terminal are produced on the bus 10 by appropriate phasing of the windings of the transformer 42.

An input of the synchronizing circuit 44, an input of the amplifier 46, and an output of the line driver 56 are coupled to the bus 10 via the transformer 42. In response to signals on the bus 10 the synchronization circuit 44 produces in known manner signals ST, EN, and L which are shown in FIG. 5. FIG. 5 also shows a signal TR supplied from a serial output SO of the shift register 54 to an input of the line driver 56 and an input of the exclusive-or gate 50, a signal BUS on the bus 10, a consequent received signal RX supplied from an output of the amplifier 46 to another input of the exclusive-or gate 50, and a signal RB which is supplied from the output of the exclusive-or gate 50 to a serial input SI of the shift register 52 and which contains the recovered byte transmitted from the other terminal connected to the bus 10, for the case of the transmitted bytes shown in FIG. 2.

The signal ST produced by the synchronizing circuit 44 is applied to a strobe input of the amplifier 46 and to a clock input C of the shift register 52, which responds to the falling edges of the signal ST to shift in the signal RB at times indicated by arrows in FIG. 5. The signal EN is applied to an enable input of the line driver 56 and to a clock input C of the shift register 54, which responds to the rising edges of the signal EN to shift out the signal TR to the line driver 56. The signal LD is applied to load inputs L of the shift registers 52 and 54 and the data terminal unit 50; in response to each logic '1' pulse of the signal L an 8-bit byte recovered, received byte is loaded from a parallel output PO of the shift register 52 into an input port IN of the unit 50, and an 8-bit byte for transmission is loaded from an output port OUT of the unit 50 into the shift register 54 via a parallel input PI thereof.

The synchronizing circuit 44 ensures that the terminal operates in bit synchronism with another terminal coupled to the bus 10 in the same manner as described above. Accordingly, bits transmitted to the bus from the terminals coincide, and in the case of simultaneous '1' bits, cancel one another, as described above with reference to FIG. 2. Consequently, in each terminal the received signal RX, which is derived from the signal on the bus 10 under control of the strobe signal ST by rectification and amplification in the amplifier 46 to produce a rectangular waveform, has the form shown in FIG. 5 for the transmitted bytes shown in FIG. 2. This signal is exclusively-ored with the transmitted byte, signal TR, of the individual terminal to produce the signal RB, which at the instants indicated by arrows in FIG. 5 corresponds to the byte transmitted from the other terminal and is shifted into the shift register 52 as the recovered, received byte.

Although a particular embodiment of the invention has been described in detail, numerous modifications, variations, and adaptations may be made thereto without departing from the scope of the invention as defined by the claims. It is observed, for example, that the rectifying amplifier 46 described above can be replaced in each terminal by a pulse amplifier which is responsive only to pulses on the bus which have the polarity transmitted by the respective other terminal.

Furthermore, it is particularly pointed out that one of the two terminals A and B described above can be constituted by a network termination of a public telecommunications network, this network termination serving to couple signals between the bus 10 as described above and a transmission line of known form, such as a telephone subscriber line. Such an arrangement enables the other of the two terminals A and B to communicate via the network termination and the public network, while retaining the bandwidth saving provided on the bus 10.

What is claimed is:

1. A method of effecting full-duplex transmission of bit (binary digit) streams serially and in bit-synchronism on a bus between two terminals, comprising the steps of:
   transmitting a bit stream from one terminal to the bus in the form of pulses of a first polarity representing bits of one binary value and the absence of such pulses representing bits of the other binary value;
   transmitting a bit stream from the other terminal to the bus in the form of pulses of a second polarity, opposite to the first polarity, representing bits of one binary value and the absence of such pulses representing bits of the other binary value; and, in each terminal:
   detecting pulses on the bus to produce a received bit stream; and
   at each respective terminal effecting an exclusive-OR of the received bit stream with the bit stream transmitted by the respective terminal to recover the bit stream transmitted by the other terminal.

2. A method as claimed in claim 1 wherein the step of detecting pulses on the bus to produce the received bit stream comprises rectifying pulses on the bus to produce the received bit stream as a unipolar bit stream.

3. A method as claimed in claim 1 wherein the bus is a two-wire line.

4. Apparatus comprising a bus and two terminals coupled thereto for full-duplex transmission of bit streams serially and in bit-synchronism therebetween, each terminal comprising means for supplying a bit stream to be transmitted to the bus in the form of a unipolar pulsed signal, the polarities of the unipolar pulsed signals supplied to the bus by the two terminals being opposite to one another, each terminal further comprising means responsive to pulses on the bus for producing a received bit stream, and an exclusive-OR gate responsive to the received bit stream and to the bit stream transmitted by the terminal to produce a recovered bit stream corresponding to the bit stream transmitted by the other terminal.

5. Apparatus as claimed in claim 4 wherein in each terminal the means responsive to pulses on the bus for producing a received bit stream comprises a rectifying amplifier responsive to pulses of either polarity on the bus for producing pulses of said received bit stream.

6. Apparatus as claimed in claim 4 wherein each terminal further comprises transmitting shift register means for producing said bit stream to be transmitted, receiving shift register means responsive to the recovered bit stream, and means for supplying bytes to the transmitting shift register means and for receiving bytes from the receiving shift register means, each byte comprising a plurality of bits.

\* \* \* \* \*

UNITED STATES PATENT AND TRADEMARK OFFICE
CERTIFICATE OF CORRECTION

PATENT NO. : 4,516,236
DATED : May 7, 1985
INVENTOR(S) : Faruk HADZIOMEROVIC

It is certified that error appears in the above-identified patent and that said Letters Patent are hereby corrected as shown below:

On the title page

The Inventor's surname "Hadziomerovi" should be --Hadziomerovic--.

Signed and Sealed this

Twelfth Day of November 1985

[SEAL]

Attest:

Attesting Officer

DONALD J. QUIGG

Commissioner of Patents and Trademarks